United States Patent

[11] 3,633,553

[72] Inventor George L. Holzapfel
Los Angeles, Calif.
[21] Appl. No. 8,644
[22] Filed Feb. 4, 1970
[45] Patented Jan. 11, 1972
[73] Assignee John R. Gumbiner
Los Angeles, Calif.
a part interest

[54] INTERNAL COMBUSTION ENGINE CONSTRUCTION INCLUDING IMPROVED FUEL SYSTEM
8 Claims, 1 Drawing Fig.
[52] U.S. Cl.................................................. 123/75 B,
123/119 A, 123/127, 123/133
[51] Int. Cl........................................................F02b 75/02,
F02n 25/06, F02n 13/04
[50] Field of Search............................................ 123/75 B,
133, 127, 119 A

[56] References Cited
UNITED STATES PATENTS
678,823 7/1901 Bramwell..................... 123/75 B
3,380,442 4/1968 Johnson........................ 123/127
3,382,856 5/1968 McIlroy........................ 123/127

Primary Examiner—Wendell E. Burns
Attorney—Mahoney, Hornbaker & Schick

ABSTRACT: Liquid fuel is supplied at atmospheric pressure or through a pressure regulator reducing the pressure thereon below atmospheric and then to a preheating-mixing chamber where a portion of the exhaust gases from a reciprocating piston cylinder, or warm air, or a mixture of both, is circulated around the liquid fuel preheating and vaporizing the same. A mixture of fuel and exhaust gas or warm air is then formed in the preheating-mixing chamber with portions of said gas mixture transmitted through a throttle valve to the preferably uninhibited air intake of a main intake valve and to the air intake of an antechamber opening into the cylinder. An auxiliary valve at the antechamber admits the fuel-exhaust-air gas mixture into said antechamber with ignition means igniting the same therein and through such ignition igniting the main charge of fuel-exhaust-air gas mixture from the main intake valve, the combination driving the piston of the cylinder. An electric resistance heater may be provided in the preheating-mixing chamber for vaporizing the entering liquid fuel prior to starting the engine and the initial starting of the engine may be accomplished by a fuel-air gas mixture solely within the antechamber and while the fuel-exhaust gas throttle valve to the main intake is closed.

INVENTOR.
GEORGE E. HOLZAPFEL
BY MAHONEY, HORNBAKER
AND SCHICK
ATTORNEYS 3,633,553

INTERNAL COMBUSTION ENGINE CONSTRUCTION INCLUDING IMPROVED FUEL SYSTEM

BACKGROUND OF THE INVENTION

This invention relates to an internal-combustion engine construction having an improved fuel system therefor, and more particularly the internal-combustion engine of the present construction makes use of a novel fuel system providing a combustible mixture of extremely high air content at all but full power preferably combined with recirculation and a reburning of a portion of the exhaust gas products of combustion so as to maintain combustion temperatures low reducing oxides of nitrogen and the richness of the fuel mixture low to reduce hydrocarbons and carbonmonoxide in the exhaust gases ultimately exhausted from the engine. In addition, by use of increased air content in the gas mixture consumed and the ignition of a portion of the gas mixture within a cylinder-connected antechamber for producing the main combustion within the cylinder, a marked increase in total gas mixture burning is accomplished with reduced fuel consumption, while still reducing the atmosphere polluting products of combustion. Thus, the improved internal combustion engine of the present invention has a greatly increased efficiency with a desirably "clean" emission characteristic.

Various and sundry internal combustion engine constructions, many including different fuel systems, have heretofore been provided with the specific goal of increasing the efficiency thereof and reducing the atmosphere pollutants caused by exhaust emissions therefrom. Although some slight advances have been made along these lines of development, nothing of marked advantage or marked improvement has thus far been produced. In any event, these prior attempts have been by two basic approaches, namely, more efficient combustion in order to originally reduce the quantity of hydrocarbon and carbonmonoxide pollutants in the products of combustion and a recirculation of a portion of the products of combustion in order to reduce the undesirable oxides of nitrogen as pollutants.

In the first basic method of approach, greater combustion efficiency can unquestionably reduce the quantity of hydrocarbon pollutants in the exhaust emissions. This, however, does not necessarily have any great effect on the oxides of nitrogen in the exhaust emissions, which are equally important and can cause equal if not greater atmosphere pollution. As a matter of fact, many of the prior internal-combustion engines designed for increased efficiency in combustion produce higher temperature combustions therein as a result of producing the increased efficiency, and this has exactly an adverse effect on the amounts of oxides of nitrogen by necessarily increasing the same.

In the second basic approach, where a determined portion of the exhaust emissions are recirculated and mixed with entering fuel, the combustion temperatures may be reduced for a reduction of oxides of nitrogen in the ultimate exhaust emissions, but the introduction of the combustion product portions into the cylinder fuel charge has reduced the overall combustion efficiency, increasing hydrocarbon and carbonmonoxide emissions. In other words, unless something more is added by a novel design for increased combustion efficiency, the addition of a portion of the products of combustion to the entering pure fuel mixture can result in an overall reduction in combustion efficiency, defeating the very advantages sought. The result again, therefore, is one tending to increase the problems rather than reduce the same, particularly under any conditions other than those very closely controlled and not possible in the ordinary use of internal combustion engines.

OBJECTS AND SUMMARY OF THE INVENTION

It is, therefore, an object of this invention to provide an internal combustion engine construction including an improved fuel system wherein both the efficiency of combustion is increased and the atmosphere polluting products of combustion are reduced. With the internal combustion engine construction and the improved system therefor of the present invention, due to a form of two-stage combustion, it is possible to maintain extremely high combustion efficiency despite the fact that a portion of the combustion exhaust gases may be recirculated and an extremely high air content in the combustion mixture is maintained at all but full power, resulting in reduced combustion temperatures at low speed or low power so as to not only reduce the hydrocarbons but also discourage formation of oxides of nitrogen. Although production of oxides of nitrogen will be increased under comparatively high engine loads, the reduced temperatures of combustion will still maintain the resulting oxides of nitrogen at a much lower level than has heretofore been possible and well within tolerable limits as far as atmosphere pollution is concerned.

It is a further object of this invention to provide an internal combustion engine construction having the improved fuel system therefore wherein the fuel charge made up of a mixture of vaporized fuel, air and in some cases, exhaust gases, is introduced in part into a main combustion chamber antechamber with the remainder or main part of the vaporized fuel charge introduced into the combustion chamber in a somewhat normal manner, the total fuel charge then being ignited from within the antichamber, resulting in the two-stage combustion and increased combustion efficiency. At the same time it is preferred to completely control the intake of the main fuel charge part with the auxiliary antechamber fuel charge part being capable of supporting combustion for engine starting and idling. In this manner, at low loads for the engine, the fuel-air mixture may be extremely lean, that is, of inordinately high air content, reducing the low load combustion temperatures to a minimum and discouraging the formation of the oxides of nitrogen. At the higher engine loads, the main fuel mixture charge part is, of course, increased, but the two-stage combustion hereinbefore discussed still produces the lower temperature combustion and greater combustion efficiency and reduces the overall production of atmosphere pollutants in the engine exhaust emissions.

It is also an object of this invention to provide an internal combustion engine construction having an improved fuel system wherein liquid fuel, such as gasoline, is completely vaporized by use of recirculated exhaust gas heat or warm air heat so as to provide a more complete fuel-air mixture prior to entrance into the cylinder combustion chamber, again increasing the overall efficiency of combustion. In the improved fuel system of the present invention, the liquid fuel enters the preheating-mixing chamber at preferably a slightly reduced pressure from atmospheric, circulates through a preheating coil around which the recirculating exhaust gases, or warm air, or a mixture of both, are flowing with the resulting completely vaporized fuel then being mixed with the recirculated exhaust gases or air and divided into the main and antechamber portions for further mixing with air to produce the final fuel mixture charges. At initial starting of the internal combustion engine prior to the availability of hot recirculating exhaust gases, the liquid fuel may be still completely vaporized in the same coil system by use of auxiliary heating means, preferably electric resistance heating within the fuel vaporization coil is electric resistance heated by passing electrical power directly therethrough.

Other objects and advantages of the invention will be apparent from the following specification and the accompanying drawings which are for the purpose of illustration only.

BRIEF DESCRIPTION OF THE DRAWING

The FIGURE is a partial vertical sectional view and a partial somewhat diagrammatic view showing an embodiment of the internal-combustion engine construction having the improved fuel system of the present invention.

DESCRIPTION OF THE BEST EMBODIMENT CONTEMPLATED

Figure 1:
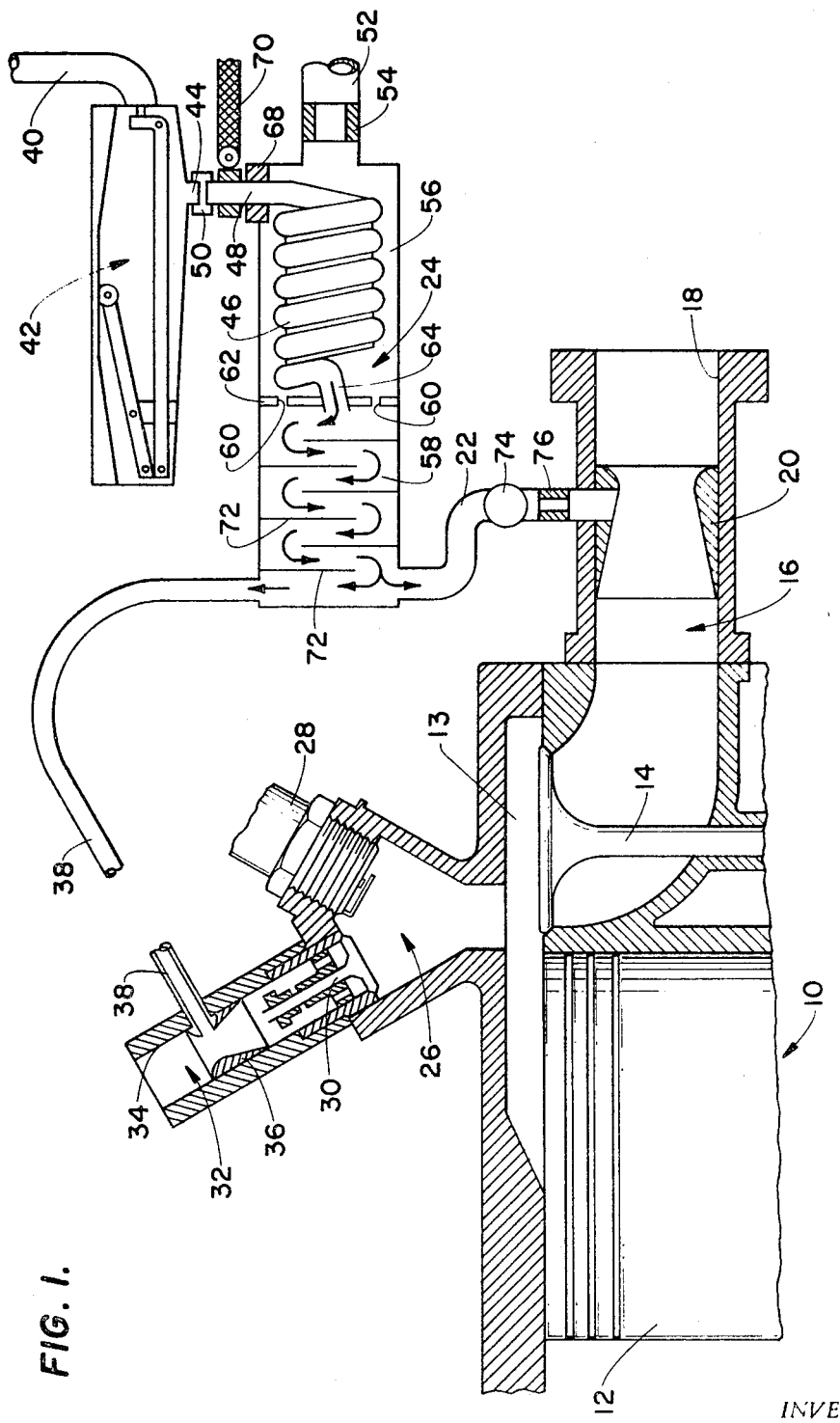

Referring to the drawing, an embodiment of the internal-combustion engine construction with the improved fuel system of the present invention is shown as including a cylinder generally indicated at 10 having a reciprocating piston generally indicated at 12 and a usual main fuel intake passage 13 connecting an upper portion of the cylinder with a main intake valve 14. Usual exhaust outlet means is also provided for the cylinder 1 in usual manner, such as an exhaust valve (not shown), operating in the conventional timing of the internal combustion engine cylinder cycle. Although a particular form of main intake valve connection to the cylinder 10 has been shown, it should be understood that this is purely for illustration purposes and it is not intended to limit the principles of the present invention to the specific form shown.

More important to the principles of the present invention, the inlet side of the main intake valve 14 is connected to a main air intake generally indicated at 16 which, in the form shown, is comprised of a main air orifice 18 communicating inwardly through a venturi 20 with the inlet side of the main intake valve 14. Also, a main fuel outlet passage 22 of a preheating-mixing chamber generally indicated at 24 communicates with the main air intake 16 intermediate the venturi 20 providing a fuel gas mixture to the main air intake as will be hereinafter explained.

Intermediate the main fuel intake passage 13 and between the main part of the cylinder 10 and the main intake valve 14, is formed an intake fuel antechamber generally indicated at 26 permanently downwardly opening into the main portion of the cylinder 10. The intake fuel antechamber 26 has conventional and timed ignition means therein in the form of a conventional sparkplug 28 which provides the sole ignition for the cylinder 10. The intake fuel antechamber 26 is also connected upwardly through a normally spring closed intake valve 30 with an antechamber air intake generally indicated at 32.

The antechamber air intake 32, similar to the main air intake 16 previously described, includes an auxiliary air orifice 34 communicating with the inlet side of the intake valve 30 through a venturi 36. An auxiliary fuel outlet passage 38 again from the preheating-mixing chamber 24 opens into the antechamber air intake 32 intermediate the venturi 36 as shown. Thus, although the antechamber intake valve 30 could be mechanically timed operated in the usual manner similar to the main intake valve 14 as is conventional in internal combustion engines, the particular form of antechamber intake valve 30 illustrated through the normally spring closed actuation thereof will open as a result of the suction stroke of the piston 12 in the cylinder 10 admitting a specific form of fuel-air mixture from the antechamber air intake 32 as will be hereinafter more particularly described.

A main fuel inlet line 40 directs liquid fuel into the preheating-mixing chamber 24 preferably through a pressure regulator 42, the pressure of the liquid fuel being regulated by the pressure regulator to one-sixteenth inch of water gage below atmospheric pressure. As shown, the liquid fuel leaves the pressure regulator 42 through a fuel outlet 44 and enters the preheating-mixing chamber 24 within a preheating and vaporizing fuel coil 46 contained within said preheating-mixing chamber. The fuel coil 46 is formed of an electrically conducting metal and an inlet end 48 thereof of an electrically conducting metal and an inlet end 48 thereof is connected to the fuel outlet 44 of the pressure regulator 42 through a nonconducting connector 50 to thereby electrically isolate the same from the pressure regulator for a purpose to be hereinafter explained.

An exhaust gas inlet passage 52 having a metering jet 54 communicates into a fuel preheating and vaporizing portion 56 of the preheating-mixing chamber 24 which is the same portion thereof containing the fuel coil 46, the exhaust gas inlet passage 52 receiving a portion of the exhaust gases directly from the exhaust outlet of the cylinder 10 in the usual manner and recirculating such exhaust gases back to this preheating-mixing chamber 24. As shown, the exhaust gas inlet passage 52 opens into the main part of the fuel preheating and vaporizing portion 56 of the preheating-mixing chamber 24 so that exhaust gases entering therethrough surround the fuel coil 46 and ultimately exit that portion into a mixing portion 58 through orifices 60 of a partition 62. The partition 62 is formed of an electrically conducting material and also supports an outlet end 64 of the fuel coil 46 which outlet end opens therethrough into the mixing portion 58 of the preheating-mixing chamber 24.

It will be further noted that the inlet end 48 of the fuel coil 46 is also electrically isolated from the preheating-mixing chamber 24 through an insulator 68 so that the partition 62 between the two portions of the preheating-mixing chamber may serve as an electrical ground for any electrical power directed into the fuel coil 46. Thus, an electric line 70 is connected to the inlet end 48 of the fuel coil 46 between the nonconducting connector 50 at the pressure regulator 42 and the insulator 68 at the preheating-mixing chamber 24. When electrical power is directed through the electric line 70, the fuel coil 46 may, therefore, act an an electric resistance heater for heating liquid fuel passing therethrough for a purpose to be hereinafter explained more in detail.

The mixing portion 58 of the preheating-mixing chamber 24 is formed with a series of baffles 72 requiring flow therein from the fuel preheating and vaporizing portion 56 to move in a circuitous path ultimately to the main fuel outlet passage 22 and the auxiliary fuel outlet passage 38. As previously described, the main fuel outlet passage 22 communicates into the main air intake 16 and the auxiliary fuel outlet passage 38 communicates into the antechamber air intake 32. Furthermore, the main fuel outlet passage 22 between the preheating-mixing chamber 24 and the main air intake 16 has a selectively regulated throttle valve 74 and a usual metering jet 76.

In operation of the internal-combustion engine construction having the improved fuel system of the present invention, there are three distinct phases or conditions involved, namely, starting, idle operation and power operation. The functioning of the various elements of the construction and fuel system will be described below in the order listed.

Prior to starting of the internal-combustion engine, there are, of course, no exhaust gases available so that electrical power is first directed through the electrical line 70 into the fuel coil 46 causing the same to act as a resistance heater and be heated. Liquid fuel is then admitted through the main fuel inlet line 40 flowing through the pressure regulator 42 and into the fuel coil 46 where the liquid fuel is preheated and vaporized passing through the partition 62 and into the mixing portion 58 of the preheating-mixing chamber 24. From the mixing portion 58 of the preheating-mixing chamber 24, the vaporized fuel or fuel gas flows into the main fuel outlet passage 22 but is prevented from entering the main air intake 16 by the now closed throttle valve 74 so that the only flow thereof for operational use in the internal-combustion engine is through the auxiliary fuel outlet passage 38 to the antechamber air intake 32 of the intake fuel antechamber 26.

The internal-combustion engine is then turned over by the usual auxiliary starting means and an intake stroke of the piston 12 within the cylinder 10 causes the antechamber intake valve 30 to open, drawing air in through the antechamber air intake 32 mixed with fuel gas from the auxiliary fuel outlet passage 38 at the venturi 36 and the fuel-air gas mixture is ultimately drawn into both the intake fuel antechamber 26 and the cylinder 10. At the end of the intake stroke of the piston 12, the antechamber intake valve 30 automatically closes, due to lack of continuing intake forces. During this intake stroke, however, the main intake valve 14 is opened in its normal timed relationship relative to the movement of the piston 12, so that further air is drawn into the cylinder 10, providing an overall lean fuel-air gas mixture.

At the appropriate time relative to the following compression stroke of the piston 12, the fuel-air gas mixture in the antechamber is ignited by the sparkplug 28, thereby commencing operation of the internal combustion engine. As the portion of the fuel-air mixture within the intake fuel antechamber 26 is ignited, the initial combustion flashes down into the cylinder 10, creating considerable turbulence therein and thoroughly igniting all fuel-air mixture within the cylinder and providing an overall extremely complete and efficient combustion. Also, the combustion is at relatively low temperatures so as to discourage the formation of oxide of nitrogen in the resulting exhaust gases.

With the completion of a total cycle of the piston 12 in the cylinder 10, including the usual exhaust stroke dispelling the exhaust gases through the usual exhaust outlet means, a portion of such exhaust gases are directed into the exhaust gas inlet passage 52 and through the metering jet 54 thereof into the fuel preheating and vaporizing portion 56 of the preheating-mixing chamber 24 around the fuel coil 46 so as to provide the necessary heat for preheating and vaporizing the liquid fuel entering the fuel coil from the pressure regulator 42. This thereby permits disconnection of the electrical power through the electric line 70 to the fuel coil 46 and starts the idle phase or condition of the internal-combustion engine. The throttle valve 74 in the main fuel outlet passage 22 of the preheating-mixing chamber 24 still remains closed during this idle condition and the hot exhaust gases entering the fuel preheating and vaporizing portion 56 of the preheating-mixing chamber 24 circulate around the fuel coil 46 providing the heat for preheating and vaporizing the liquid fuel as stated and then pass through the orifices 60 of the partition 62 into the mixing portion 58 thoroughly intermixing with the vaporized fuel or now fuel gas from the fuel coil 46 during passage with said fuel gas around the baffles 72.

Ultimately, the now fuel-exhaust gas mixture within the mixing portion 58 of the preheating-mixing chamber 24 passes outwardly through the auxiliary fuel outlet passage 38 to the venturi 36 of the antechamber air intake 32, again, the passage of this fuel-exhaust gas mixture through the main fuel outlet passage 22 of the preheating mixing chamber being prevented by the throttle valve 74 remaining closed. At the antechamber air intake 32, the intake strokes of the piston 12 cause the antechamber intake valve 30 to open, drawing into the intake fuel antechamber 26 of the fuel-exhaust gas mixture at the venturi 36 and a larger quantity of air through the auxiliary air orifice 34, resulting in a total mixture within the intake fuel antechamber of fuel-exhaust-air for ignition by the sparkplug 28. At the same time, during the piston 12 intake strokes, the main intake valve 14 opens and closes in its normal timed cycle, providing additional air through the main air orifice 18 of the main air intake 16 as hereinbefore described.

Upon ignition of the part of the fuel-exhaust-air mixture charge within the intake fuel antechamber 26, the previously described two-phase or two-stage combustion takes place initially within the antechamber and flashing downwardly into the cylinder 10, providing the mixing turbulence and complete combustion at relatively low temperatures of the entire fuel-exhaust-air mixture. Clearly, and as hereinbefore discussed, the recirculating of the portion of the hot exhaust gases will not only preheat and vaporize the entering liquid fuel within the preheating-mixing chamber 24, but will also provide sufficient heat for preventing any recondensation of the fuel in passage to the intake fuel antechamber 26. Furthermore, the final fuel-exhaust-air mixture consumed by the internal combustion engine is an extremely lean mixture of fuel which reduces the combustion temperatures, discouraging the formation of oxides of nitrogen, yet is sufficient to sustain the idle condition of the internal-combustion without the opening of the throttle valve 74.

During the power phase or power condition of the internal combustion engine, the throttle valve 74 is opened according to power requirements admitting a portion of the fuel-exhaust gas mixture from the mixing portion 58 of the preheating-mixing chamber 24 through the metering jet 76 of the main fuel outlet passage 22 into the venturi 20 of the main air intake 16 and permitting the same to mix with the air drawn in through the main orifice 18. The additional fuel-exhaust-air mixture enters through the main intake valve 14 at the same time as the similar mixture entering the intake fuel antechamber 26. Although additional oxides of nitrogen be produced as a result of this heavier load mixture, such production will still be reduced, due to the lower temperature combustions and other pollutants will be reduced due to the highly efficient two-phase or two-stage combustion caused by the ignition within the intake fuel antechamber 26.

As a slight modification to the internal combustion engine construction shown in FIG. 1 of the drawing, certain of the advantages of the present invention may be provided by vaporizing the entering liquid fuel in the fuel coil 46 of the preheating-mixing chamber merely by warm air, or with a combination of warm exhaust gases and warm air, in each case the heating medium ultimately being directed into the mixing portion of the preheating-mixing chamber to mix with the vaporized fuel and form the fuel gas mixture later mixed with further air as hereinbefore described. In the case where the portion of the exhaust gases are not used and merely warm air alone is used, such air may be preheated by any usual auxiliary means and directed into the fuel preheating and vaporizing portion 56 of the preheating-mixing chamber 24 through the exhaust gas inlet passage 52, said passage now merely being a further air inlet passage. Where a mixture of exhaust gases and warm air is used, the air may be circulated in a chamber of usual form about the exhaust gas inlet passage 52 exterior of the preheating-mixing chamber 24, and then admitted into the fuel preheating and vaporizing portion 56 of the preheating-mixing chamber in the same manner as the exhaust gases through the exhaust gas inlet passage, such modification being well known to those being skilled in the internal-combustion engine art.

Thus, in all cases, the entering liquid fuel is effectively vaporized in the fuel coil 46 within the fuel preheating and vaporizing portion 56 of the preheating-mixing chamber 24. In one case the heat for vaporization is from exhaust gases alone, in another from a mixture of exhaust gases and auxiliary warm air, and in still another from auxiliary warm air alone. In every case, however, the vaporized fuel gas leaving the preheating-mixing chamber 24 is a leaned gas mixture which is later mixed with even further air prior to use in the cylinder 10.

According to the principles of the present invention, an internal engine construction having an improved fuel system is therefore provided whereby atmosphere pollutants resulting from the exhaust emissions thereof are greatly reduced through the combination of lower combustion temperatures and a greatly improved combustion efficiency. The engine combustion temperatures are not only reduced by operating, particularly under idle condition and lower power conditions, with an extremely lean fuel mixture resulting from high air content and, in certain cases, added recirculated exhaust gases so as to discourage the formation of oxides of nitrogen, but the unique antechamber two-stage combustion permits such lean fuel mixture use so as to support an original more complete combustion thereby reducing the production of hydrocarbons and carbonmonoxide. Even at heavier engine loads requiring a richer fuel-air mixture, the lower combustion temperatures and leaner fuel mixture still reduce over anything heretofore possible the production of oxides of nitrogen, hydrocarbons and carbon monoxide, the major atmosphere pollutants in the exhaust gases ultimately emitted to the atmosphere.

I claim:

1. In the internal-combustion engine of the type having a cylinder containing a reciprocating piston with an intake fuel passage communicating between a top portion of said cylinder and an outlet side of a main intake valve and with exhaust outlet means for said cylinder; the combination of: a main air intake communicating with an inlet side of said main intake valve and having an air intake portion communicating with a supply of air; a preheating-mixing chamber including fuel inlet means directing liquid fuel from a supply thereof into said chamber, exhaust gas inlet means communicating with said cylinder exhaust outlet means directing a portion of hot exhaust gases from said cylinder into said chamber for mixture with and vaporization of said liquid fuel resulting in a preheated fuel and exhaust gas mixture in said chamber, main fuel outlet means directing a portion of said gas mixture from said chamber into said main air intake for mixture with air therein, auxiliary fuel outlet means directing a portion of said gas mixture from said chamber; an intake fuel antechamber communicating with said cylinder including air intake means communicating with a supply of air, fuel inlet means connected with said auxiliary fuel outlet means of said preheating-mixing chamber directing said gas mixture portion into said air intake means for mixture with air therein, auxiliary valve means between said air intake means and said antechamber for opening and permitting a flow of said mixture of said gas mixture portion and said air into said antechamber during an intake stroke of said cylinder piston; and ignition means for igniting charges of a mixture of gas mixture and air received at said cylinder.

2. An internal-combustion engine as defined in claim 1 in which said intake fuel antechamber opens into said intake fuel passage and through said intake fuel passage into said cylinder.

3. An internal-combustion engine as defined in claim 1 in which said auxiliary valve means of said intake fuel antechamber is comprised of a valve normally resiliently urged to closed position and temporarily urged to open position by reduced pressure in said antechamber resulting from said intake stroke of said cylinder piston.

4. An internal-combustion engine as defined in claim 1 in which said fuel inlet means of said preheating-mixing chamber comprises a fuel inlet coil in said chamber receiving said hot exhaust gases of said exhaust gas inlet means therearound vaporizing said liquid fuel prior to mixture with said exhaust gases within said preheating-mixing chamber.

5. An internal-combustion engine as defined in claim 1 in which said fuel inlet means of said preheating-mixing chamber comprises a fuel inlet coil in said chamber receiving said hot exhaust gases of said exhaust gas inlet means therearound vaporizing said liquid fuel prior to mixture with said exhaust gases within said preheating-mixing chamber, auxiliary electric heating means for heating said coil of said fuel inlet means to vaporize said liquid fuel therein prior to initial operation of said internal combustion engine and prior to availability of said hot exhaust gases from said exhaust gas inlet means.

6. An internal-combustion engine as defined in claim 1 in which said fuel inlet means of said preheating-mixing chamber comprises a fuel inlet coil in said chamber receiving said hot exhaust gases of said exhaust gas inlet means therearound vaporizing said liquid fuel prior to mixture with said exhaust gases within said preheating-mixing chamber, auxiliary electric heating means for heating said coil of said fuel inlet means to vaporize said liquid fuel therein prior to initial operation of said internal combustion engine and prior to availability of said hot exhaust gases from said exhaust gas inlet means; and in which said main fuel outlet means of said preheating-mixing chamber comprises throttle valve means for controlling flow of said portion of said gas mixture from said chamber into said main air intake.

7. An internal-combustion engine as defined in claim 1 in which liquid fuel pressure regulator means is positioned between said liquid fuel supply and said preheating-mixing chamber receiving liquid fuel from said supply and reducing pressure thereon below atmospheric prior to directing said liquid fuel to said fuel inlet means of said preheating-mixing chamber.

8. A internal-combustion engine as defined in claim 1 in which said fuel inlet means of said preheating-mixing chamber comprises a fuel inlet coil in said chamber receiving said hot exhaust gases of said exhaust gas inlet means therearound vaporizing said liquid fuel prior to mixture with said exhaust gases within said preheating-mixing chamber, auxiliary electric heating means for heating said coil of said fuel inlet means to vaporize said liquid fuel therein prior to initial operation of said internal combustion engine and prior to availability of said hot exhaust gases from said exhaust gas inlet means; in which said main fuel outlet means of said preheating-mixing chamber comprises throttle valve means for controlling flow of said portion of said gas mixture from said chamber into said main air intake; and in which said intake fuel antechamber opens into said intake fuel passage and through said intake fuel passage into said cylinder.

* * * * *